United States Patent [19]
Roux et al.

[11] Patent Number: 5,107,492
[45] Date of Patent: Apr. 21, 1992

[54] METHOD AND DEVICE FOR MANAGING ACCESS TO THE TRANSMISSION MEDIUM OF A MULTISERVICE DISTRIBUTED SWITCHING NETWORK

[75] Inventors: Raphaël Roux, Argenteuil; Ji-Yong Wu, Paris, both of France

[73] Assignee: Alcatel Business Systems, Paris, France

[21] Appl. No.: 540,245

[22] Filed: Jun. 19, 1990

[30] Foreign Application Priority Data

Jun. 19, 1989 [FR] France .................. 89 08114

[51] Int. Cl.[5] .......................... H04J 3/02; H04J 3/24
[52] U.S. Cl. ................... 370/85.6; 370/85.11; 370/94.2; 340/825.51
[58] Field of Search .......... 370/94.2, 94.1, 60.1, 370/60, 85.6, 95.1, 85.1, 85.9, 85.2, 85.11; 340/825.5, 825.51

[56] References Cited[1]

U.S. PATENT DOCUMENTS

| | | | |
|---|---|---|---|
| 4,445,213 | 4/1984 | Baugh et al. | 370/94.2 |
| 4,608,685 | 8/1986 | Jain et al. | 370/94.2 |
| 4,630,261 | 12/1986 | Irvin | 370/95.1 |
| 4,663,755 | 5/1987 | Lewis | 370/60 |
| 4,710,918 | 12/1987 | Miyao | 370/94.2 |
| 4,718,062 | 1/1988 | Andersen | 370/94.1 |
| 4,731,785 | 3/1988 | Ferenc et al. | 370/94.1 |
| 4,761,781 | 8/1988 | Calvignac et al. | 370/94.2 |

FOREIGN PATENT DOCUMENTS

| | | |
|---|---|---|
| 122765 | 10/1984 | European Pat. Off. |
| 229684 | 7/1987 | European Pat. Off. |
| 276349 | 8/1988 | European Pat. Off. |

Primary Examiner—Bendict V. Safourek
Assistant Examiner—H. Kizou
Attorney, Agent, or Firm—Sughrue, Mion, Zinn, Macpeak & Seas

[57] ABSTRACT

Method and device for managing access to the transmission medium of a multiservice distributed switching network adapted to switch traffic in synchronous circuit-switched mode and in synchronous or asynchronous packet-switched mode, the architecture of the network being based on a transmission medium time-shared between different stations characterized in that: (1) the transmission medium is synchronous and structured in frames in turn structured in time slots in turn structured in time cells, the latter being sized to contain a communication entity which can be either a circuit-switched cell or a segmented packet-switched cell, (2) an ideal time slot for access to the transmission medium in packet-switched mode is assigned to the respective stations communicating within the network, and (3) in each time cell and for all stations transmission medium access arbitration is applied to procure priority access to this medium for circuit-switched cells available at this time in any station.

11 Claims, 3 Drawing Sheets

METHOD AND DEVICE FOR MANAGING ACCESS TO THE TRANSMISSION MEDIUM OF A MULTISERVICE DISTRIBUTED SWITCHING NETWORK

BACKGROUND OF THE INVENTION

The present invention concerns a method and a device for managing access to the transmission medium of a multiservice distributed switching network adapted to switch traffic in synchronous circuit-switched mode and in synchronous or asynchronous packet-switched mode.

Current switching systems use either circuit-switched mode or packet-switched mode.

The problem with having these two modes co-exist results from the fact that, on the one hand, the needs of high data rate communications mean that the circuit-switched mode must use multiple space-switched parallel transmission media or multiple time-switched time slots, which is ill-suited to the transfer of sporadic information and leads to loss of capacity (resources are reserved through the call) and, on the other hand, although high data rates can be serviced in packet-switched mode it is not possible to guarantee transmission of synchronous information without lengthy time-delay.

Also, until now packet-switching in distributed switching systems has used:

either a random access protocol (for example the CSMA/CD-IEEE/802.3, ALOHA, etc protocols), in which case the access time to the transmission medium is relatively short but because of collisions, by which is meant simultaneous access to the medium by different stations of the network, the system becomes unstable as soon as its load reaches a particular limit, or deterministic access protocols (for example the TDMA, IEEE-802.4, IEEE 802.5, etc. protocols) which feature relatively lengthy access delays even where the amount of traffic is very low.

Existing access protocols cannot offer simultaneously a short access time and optimum use of the transmission medium.

SUMMARY OF THE INVENTION

One object of the present invention is a method which can simultaneously minimize the access time and optimize the use of the transmission medium.

One object of the present invention is a method for managing access to the transmission medium of a multiservice distributed switching network adapted to switch traffic in synchronous circuit-switched mode and in synchronous or asynchronous packet-switched mode, the architecture of said network being based on a transmission medium time-shared between different stations, essentially characterized in that:

the transmission medium is synchronous and structured in frames in turn structured in time slots in turn structured in time cells, the latter being sized to contain a communication entity which can be either a circuit-switched cell or a segmented packet-switched cell, an ideal time slot for access to the transmission medium in packet-switched mode is assigned to the respective stations communicating within the network, in each time cell and for all stations transmission medium access arbitration is applied to procure priority access to this medium for circuit-switched cells available at this time in any station.

According to another characteristic of the invention in each time cell and for all stations transmission medium access arbitration is applied to procure access to this medium, in decreasing priority order, to circuit-switched cells available at this time in any station, to synchronous segmented packet-switched cells available at this time in any station having an ideal access time slot anterior to the time slot containing the time cell in question, to synchronous segmented packet-switched cells available at this time in the station having as its ideal access time slot the time slot containing the time cell in question, to asynchronous segmented packet-switched cells available at this time in any station having for its ideal access time slot a time slot anterior to the time slot containing the time cell in question, and to asynchronous segmented packet-switched cells available at this time in the station having for its ideal access time slot the time slot containing the time cell in question.

According to another characteristic of the invention:

the time cells are themselves structured in time bytes, a transmission medium access time byte in circuit-switched mode is assigned respectively to various stations communicating within the network, for any station authorized after arbitration to access the transmission medium in circuit-switched mode the stations are enabled successively according to their respective allocated time bytes.

Another object of the present invention is a device for implementing this method.

BRIEF DESCRIPTION OF THE DRAWING

Other objects and characteristics of the present invention will emerge more clearly upon reading the following description of one embodiment given with reference to the appended drawings in which.

DETAILED DESCRIPTION OF THE INVENTION

Figure 1:
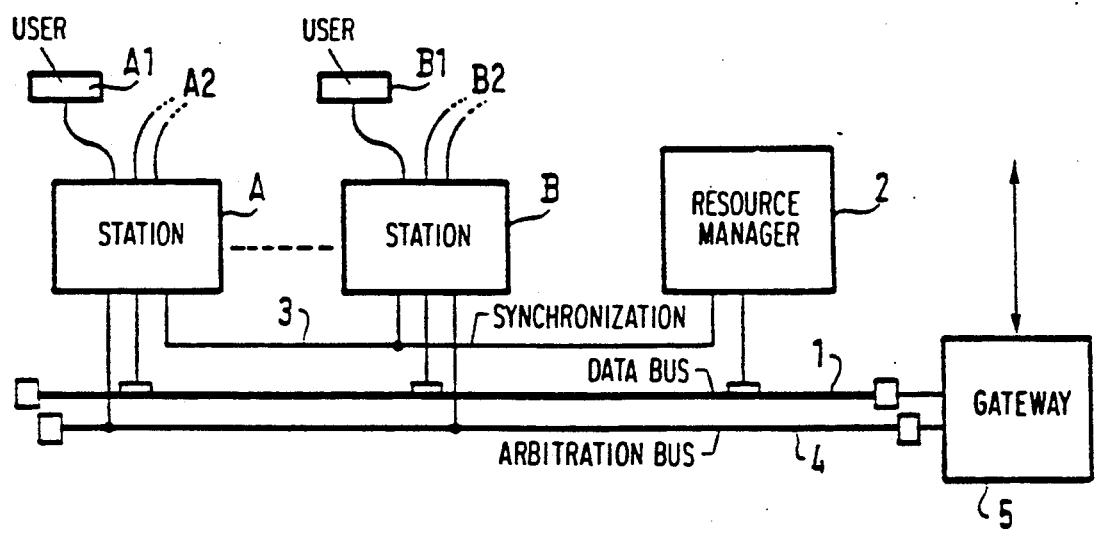
FIG. 1 shows the general block diagram of a distributed switching network in accordance with the invention.

FIG. 1 shows a set of "n" stations A and B (n=2 in this example) of a distributed switching network communicating with each other by means of a transmission medium 1 referred to hereinafter as the data bus, time-shared between the various stations, each station itself constituting a point of concentration of traffic from various users A1, A2, etc, B1, B2, etc.

Figure 2:
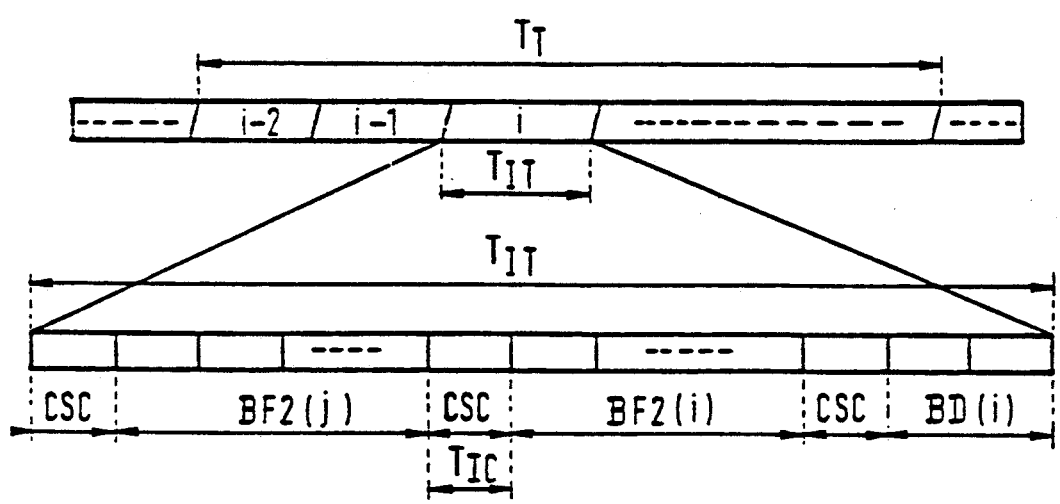
FIG. 2 shows how the transmission medium of a network in accordance with the invention is structured and one example of traffic allocation on this medium.

As shown in FIG. 2, the data bus is a synchronous bus structured in repetitive frames of duration $T_T$ in turn structured in time slots of duration $T_{IT}$ in turn divided into time cells of duration $T_{IC}$.

Each time cell is sized to contain either a circuit-switched cell or a segmented packet-switched cell.

This network can service various types of traffic:

in synchronous circuit-switched mode, with a predetermined fixed data rate, for example 64 kbit/s for a 32-channel PCM voice multiplex, the speech information carried by the voice multiplex constituting said circuit-switched cells, in synchronous packet-switched mode, with a varied and varying data rate, for example information from facsimile terminals, in asynchronous packet-switched mode, for example information from computer terminals.

The expression "segmented packet-switched cells" means fragments of packets each including the destination address of the packet and being the same size as a circuit-switched cell.

For each time cell on the data bus the circuit-switched cells take priority so that this type of traffic can be carried without delays.

The packet-switched mode traffic relating to a station I is nominally carried by a time slot $IT_i$ of the same rank i in successive frames, called the ideal access time slot of the station concerned, allocated to it beforehand by a resource management controller 2 according to the capacity of the transmission medium, the nominal capacity already allocated to calls in progress at a given time and the nominal capacity required by the station requesting access to the network at this time, so that all the traffic corresponding to these nominal capacities can be carried without delays.

The resource management controller does not form any part of the present invention and will therefore not be described in more detail.

By establishing the correspondence between the theoretical (or ideal) access time ti of a station I to the transmission medium and the end of packetization (effected in the various stations) of the data to be transmitted on this medium at this time the delay with which users access the transmission medium in the case of packet-switched mode traffic is minimized.

By setting the frame duration as equal to the packetization time, this amounts to fixing the start of packetization of the data relating to a station I to be transmitted at the ideal access time ti with the preceding access time of this station, in other words $ti - T_T$. FIG. 1 shows a link 3 effecting this synchronization of the stations on the basis of ideal access times supplied by the resource management controller 2.

By allowing synchronous packet-switched mode traffic from a station to "spill over" into cells of time slots not initially assigned to this station, in the event of synchronous packet-switched mode traffic "peaks" (as compared with the allocated nominal capacity), and by providing also for asynchronous traffic to "fill in" cells not occupied by synchronous traffic in the event of synchronous traffic "troughs", the efficiency with which the transmission medium is used is further optimized and system configuration is rendered more flexible.

The algorithm managing access to the transmission medium employed in each station will now be described with reference to FIGS. 3A and 3B.

At an ideal access time ti (start of an ideal access time slot ITi) begins the packetization of data relating to a station I to which this time slot is ideally assigned and which will (theoretically) be transmitted on the data bus at the next frame time, in other words $ti + T_T$.

At this time ti the priorities for transmission on the data bus are examined, on the one hand for circuit-switched mode data stored in the various stations in a register (or buffer) CSC, and on the other hand for data already packetized whose packetization began at the preceding frame time, in other words $ti - T_T$, and which is located in a buffer BF2 (BF2 (i) for station I) for synchronous packet-switched mode traffic or in a buffer BD (BD (i) for station I) for asynchronous packet-switched mode traffic.

Access to the data bus at the time ti is managed in the following manner:

If data is present in a CSC buffer of any station its content has priority for "spillover" onto the data bus at the rate of one circuit-switched cell per time cell "tik" within the time slot ITi in question.

If the CSC buffers are empty, the algorithm determines if data is present in the BF2 (i) buffer of the station I in question. If so, the content of the latter does not "spill over" onto the data bus immediately, but only after arbitration of any access contention with traffic of the same kind "spilled over" from stations already previously serviced on the data bus, this arbitration being carried out by an arbitration mechanism to be described later. If the station I request to the arbitration mechanism succeeds the content of the BF2 (i) buffer "spills over" onto the data bus time cell by time cell as long as the next ideal access time $(t_{i+1})$ ideally assigned to a station I+1 is not reached, priority being given for each time cell to any circuit-switched cell that may be present at this time in any station.

If the BF2 (i) buffer is empty the content of the BD (i) buffer is examined. If this buffer is full it "spills over" cell by cell provided that the next ideal access time $(t_{i+1})$ is not reached, priority being given for each time cell to any circuit-switched mode traffic to be serviced at the time in question and to any asynchronous packet-switched mode traffic "spilled over" from stations already previously serviced on the data bus.

On failure of a BF2 (i) or BD (i) buffer access request after application of the arbitration mechanism the traffic from the BF2 (j) or BD (j) buffer of the station J selected after arbitration as having the highest priority "spills over" onto the data bus, cell by cell, provided that the next ideal access time $(t_{i+1})$ is not reached, priority being given for each cell to any circuit-switched mode traffic to be serviced at the time in question.

When the next ideal access time is reached, the process described is repeated.

It is possible to provide a supplementary priority level between circuit-switched mode traffic and packet-switched mode "spillover" traffic, to enable the servicing with the corresponding priority of "external" synchronous packet-switched mode traffic, by which is meant traffic from outside the network entering the network via a gateway 5 (FIG. 1).

Figure 3A:
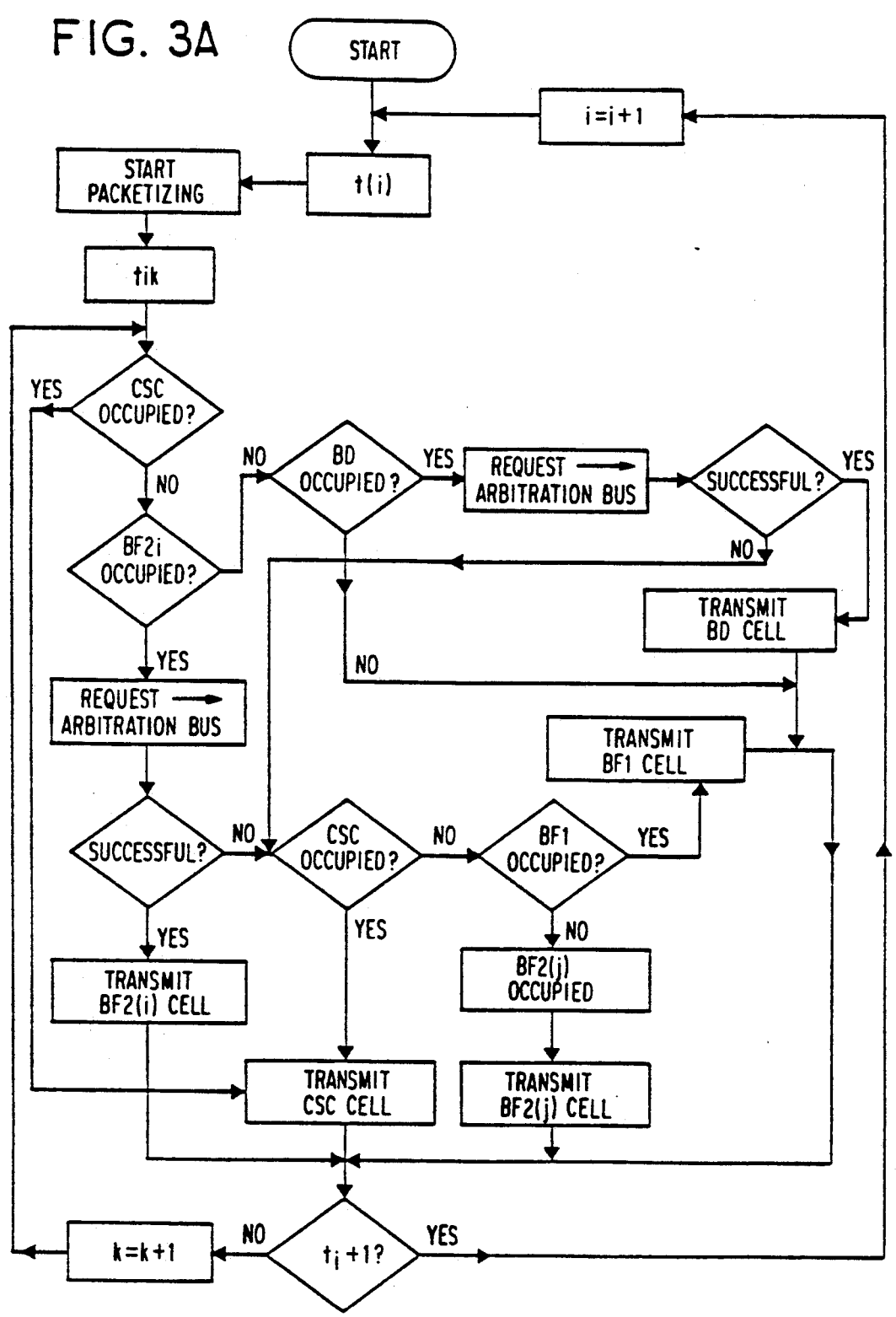
FIG. 3A shows the algorithm managing access to the transmission medium as used in each station, the various times used to define the various stages of this algorithm being shown in the timing diagram in FIG. 3B.
Figure 3B:
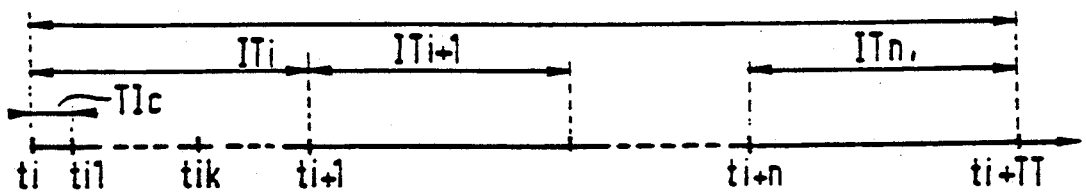

In FIG. 3A, BF1 denotes the register or buffer in which the traffic from this gateway is stored, the gateway also including a buffer CSC for circuit-switched mode traffic and a buffer BD (i) for asynchronous packet-switched mode traffic respectively processed with the same priority as "internal" circuit-switched mode traffic or "internal" asynchronous packet-switched mode traffic generated by the stations.

It will be noted that any such introduction of a supplementary priority level constitutes an additional cause for "spillover" of packet-switched mode traffic generated by the stations.

Figure 4:
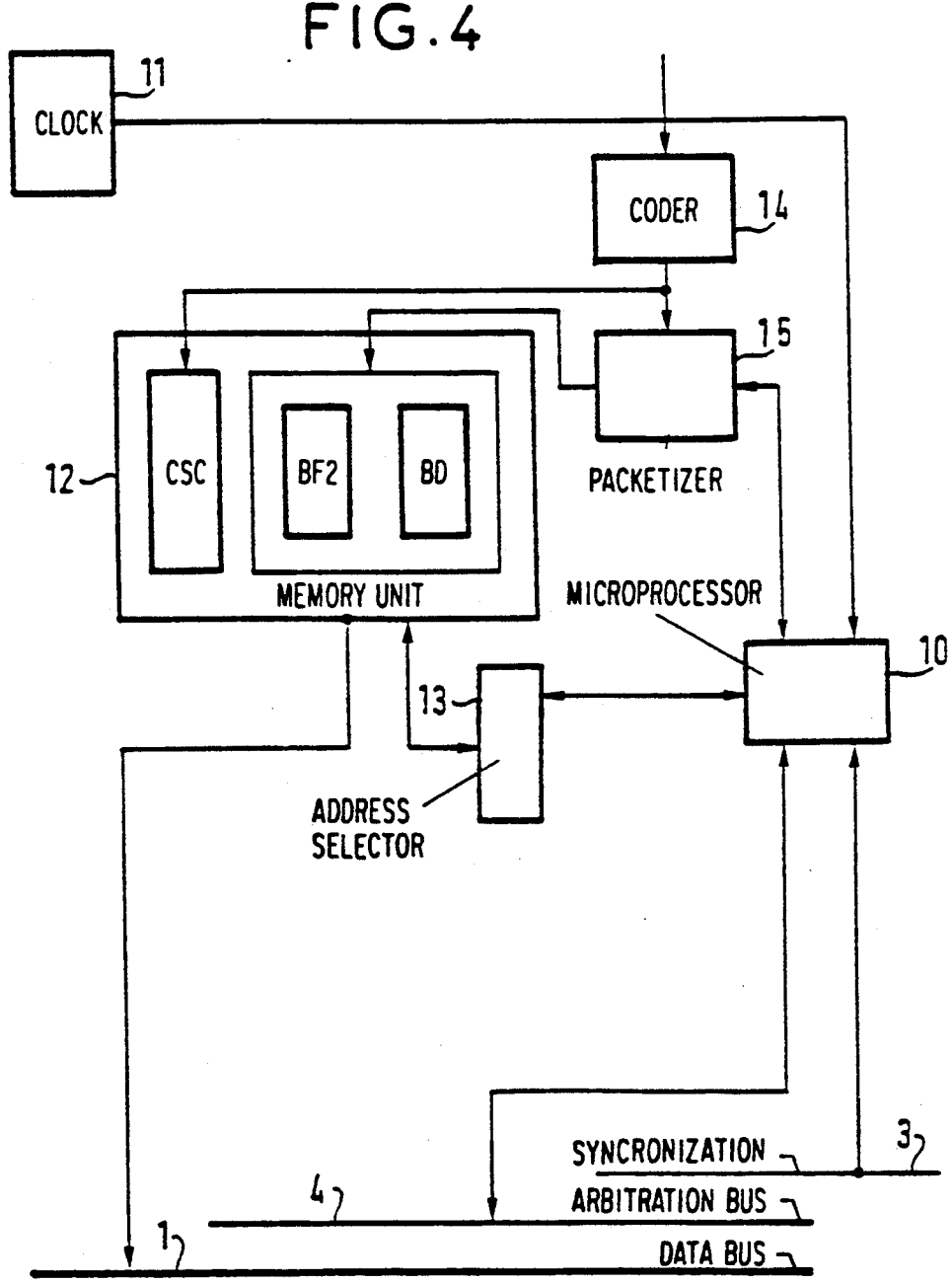
FIG. 4 shows the general block diagram of a station.

There will now be described with reference to FIG. 4 the block diagram of each station enabling application of the algorithm described above. Only the component parts of each station specific to one transmission direction, namely from the station to the data bus, will be described.

The block diagram is based on a microprocessor 10 which communicates with various components including:

a clock 11 supplying it with the repetition frequency of time cells, time slots and frames on the data bus, an arbitration bus 4 common to the various stations, a memory unit 12 containing the CSC, BF2 and BD buffers (CSC, BF1 and BD buffers in the case of a gateway), with which it communicates via an address selector 13.

The data stored in these buffers originates from a coder 14 in the case of circuit-switched mode traffic or from a packetizer 15 in the case of packet-switched mode traffic, the microprocessor 10 controlling the packetizer to synchronize packetization as described above.

The coder and the packetizer are well known in themselves and will not be described here. Suffice to say that the packetizer forms data into packets comprising data to be transmitted or signalling information for routing it and that the coder generates various speech bytes from the various users connected to the station concerned, these bytes being multiplexed into circuit-switched cells, the signalling information being transmitted separately from the speech information (or bytes).

Arbitration information applied to the arbitration bus 4 relates to the priority of the traffic in the buffers of the memory 12 detected as occupied by the microprocessor 10 via the address selector 13.

Arbitration is carried out by comparing the arbitration information applied to the arbitration bus at the same time by the various stations.

To be more precise, arbitration is carried out by writing the bus followed by reading it, any coincidence of the information written then read by a station on the arbitration bus indicating settling of the contention in favor of that station. In this instance, as writing to the arbitration bus means that the bus changes state on application of a "0" bit, the address regarded as having the highest priority after subsequent reading of the bus is that having the greatest number of "0" bits. The arbitration information concerning the priority of the various buffers is derived accordingly.

The arbitration information relating to the BF2 and BD buffers includes, in addition to information relating to the priority of the buffers, information indicating the seniority of the traffic to be serviced.

This can be obtained simply by adding to the information relating to the priority of this type of traffic information encoding the ideal access time of the station originating this traffic, in this instance by means of a code comprising the greatest number of "0" bits for the most senior ideal access time.

The microprocessor 10 of each station knows the ideal access time slot of the station, which is communicated to it by the resource management controller 2 via the synchronization link 3 (FIG. 1).

The microprocessor 10 of a station uses the result of arbitration to select the address of the buffer of that station regarded as having the highest priority after arbitration.

Access to the data bus by the data at the address selected in this way is effected as follows.

The cells being themselves divided into bytes and the various bytes of the same circuit-switched cell being distributed between different stations (by the resource management controller 2 as circuit-switched mode calls originate and terminate in the network) access to the data bus for the various buffers (in which the information is organized into bytes for this reason) is effected by addressing the memory 12 in the time bytes assigned to the station in question, under the control of the microprocessor 10 which, in addition to the ideal access time assigned to a station, knows the time bytes assigned to that station, via the same synchronization link 3.

We claim:

1. A method of managing access to the transmission medium of a multiservice distributed switching network adapted to switch traffic in synchronous circuit-switched mode and in synchronous or asynchronous packet-switched mode, said network comprising a transmission medium time-shared between different stations, said method comprising the steps of:

providing as said transmission medium a synchronous transmission medium over which information is transmitted in repetitive frames in turn structured in time slots in turn structured in time cells, said time cells being sized to contain a communication entity which can be either a circuit-switched cell or a segmented packet-switched cell;

assigning to each said station a nominal time slot for access to the transmission medium in packet-switched mode; and performing transmission medium access arbitration in each time cell, and for all stations, and granting priority access to said transmission medium for circuit-switched cells available in said each time cell in any of said stations.

2. A method according to claim 1, wherein said step of performing transmission medium access arbitration comprises granting access to said medium in a given time cell, first to circuit-switched cells available in said given time cell in any station, second to synchronous segmented packet-switched cells available in said given time cell in any station having a nominal access time slot anterior to the time slot containing said given time cell, third to synchronous segmented packet-switched cells available in said given time cell in a station having as its nominal access time slot the time slot containing said given time cell, fourth to asynchronous segmented packet-switched cells available in said given time cell in any station having for its nominal access time slot a time slot anterior to the time slot containing said given time cell, and fifth to asynchronous segmented packet-switched cells available in said given time cell in the station having for its nominal access time slot the time slot containing the time cell in question.

3. A method according to claim 1 or claim 2, characterized in that:

the time cells are themselves structured in time bytes, a transmission medium access time byte is assigned respectively to the various stations communicating in circuit-switched mode within the network, for any station granted access to said transmission medium in circuit-switched mode after arbitration, the stations are enabled successively according to their respective allocated time bytes.

4. A method according to claim 2, characterized in that segmented packet-switched cells from outside of said network entering said network via a gateway station are granted access to said transmission medium after circuit-switched cells available in said given time slot and before synchronous segmented packet-switched cells from stations having a nominal access time anterior to the time slot containing said given time cell.

5. A method according to claim 1, characterized in that the packetizing of information to be transmitted in packet-switched mode by a given station is initiated in said given station at a time determined so as to render the end of packetization coincident with the start of the nominal access time slot of said given station.

6. A method according to claim 5, characterized in that packetization is initiated one frame before the start of the nominal access time slot of the given station.

7. A device for managing access to a synchronous transmission medium time-shared between different stations of a multiservice distributed switching network adapted to switch traffic in synchronous circuit-switched mode and in synchronous or asynchronous packet-switched mode, said transmission medium comprising a synchronous transmission medium over which information is transmitted in repetitive frames in turn structured in time slots in turn structured in time cells, said time cells being sized to contain a communication entity which can be either a circuit-switched cell or a segmented packet-switched cell said device comprising means for assigning to each said station a nominal time slot for access to the transmission medium in packet-switched mode, and means for performing transmission medium access arbitration in each time cell, and for all stations, and for granting priority access to said transmission medium for circuit-switched cells available in said each time cell in any of said stations, said device being distributed between said different stations and comprising:

a series of registers at each station dedicated to each type of traffic;

detecting means at each station for detecting in said each time cell the state of said registers; and arbitration means at each station for determining the traffic and/or the station having the highest priority in said each time cell.

8. A device according to claim 7, characterized in that the arbitration means comprise an arbitration bus common to the various stations, write/read means for writing arbitration information to said bus and for reading the information then present on the bus, and means for comparing the arbitration information written to and read from said bus by a given station, identical written and then read information detected by a station indicating that that station has the highest priority.

9. A device according to claim 8, characterized in that at least some of said stations transmit plural different types of traffic onto said transmission medium, including circuit-switched mode traffic and packet-switched mode traffic, with each different type of traffic having a differing priority, and wherein said arbitration means includes encoding means for encoding priority level information representing said priority of the type of traffic currently awaiting transmission by a given station, the arbitration information written to the arbitration bus by said given station being obtained from said encoding means.

10. A device according to claim 9, wherein said encoding means includes adding means for adding seniority information to the priority of packet-switched mode traffic awaiting transmission by said given station, said seniority information relating to the seniority of said packet-switched mode traffic awaiting transmission by said given station at the time of said given time cell.

11. A device according to claim 10, characterized in that said seniority information is obtained by encoding the nominal access time slot of said given station.

* * * * *